(12) United States Patent
Zeise et al.

(10) Patent No.: US 11,443,234 B2
(45) Date of Patent: Sep. 13, 2022

(54) MACHINE LEARNING DATA PROCESSING PIPELINE

(71) Applicant: SAP SE, Walldorf (DE)

(72) Inventors: Manuel Zeise, Karlsruhe (DE); Isil Pekel, Mannheim (DE); Steven Jaeger, Heidelberg (DE)

(73) Assignee: SAP SE, Walldorf (DE)

( * ) Notice: Subject to any disclaimer, the term of this patent is extended or adjusted under 35 U.S.C. 154(b) by 534 days.

(21) Appl. No.: 16/582,946

(22) Filed: Sep. 25, 2019

(65) Prior Publication Data

US 2021/0089961 A1    Mar. 25, 2021

(51) Int. Cl.
   *G06F 9/44* (2018.01)
   *G06N 20/00* (2019.01)
   *G06F 16/901* (2019.01)
   *G06F 11/34* (2006.01)

(52) U.S. Cl.
   CPC ......... *G06N 20/00* (2019.01); *G06F 11/3466* (2013.01); *G06F 16/9024* (2019.01)

(58) Field of Classification Search
   CPC ... G06F 11/3612; G06F 3/04842; H04L 51/52
   See application file for complete search history.

(56) References Cited

U.S. PATENT DOCUMENTS

2018/0060744 A1 * 3/2018 Achin ..................... G06N 5/04

* cited by examiner

*Primary Examiner* — Chuck O Kendall
(74) *Attorney, Agent, or Firm* — Mintz Levin Cohn Ferris Glovsky and Popeo, P.C.

(57) ABSTRACT

A user interface may be generated to receive inputs for constructing a data processing pipeline that includes an orchestrator node, a preparator node, and an executor node. The preparator node may generate a training dataset and a validation dataset for a machine learning model. The executor node may execute machine learning trials by applying, to the training dataset and the validation dataset, machine learning models having different sets of trial parameters. The orchestrator node may identify, based on a result of the machine learning trials, an optimal machine learning model for performing a task. The data processing pipeline may be adapted dynamically based on the input dataset and/or computational resource budget. The optimal machine learning model for performing the task may be generated by executing, based on the graph, the data processing pipeline the orchestrator node, the preparator node, and the executor node.

20 Claims, 8 Drawing Sheets

MACHINE LEARNING DATA PROCESSING PIPELINE

TECHNICAL FIELD

The subject matter described herein relates generally to machine learning and more specifically to a data processing pipeline for implementing a machine learning enabled task.

BACKGROUND

Machine learning models may be trained to perform a variety of cognitive tasks including, for example, object identification, natural language processing, information retrieval, speech recognition, classification, regression, and/or the like. For example, an enterprise resource planning (ERP) system may include an issue tracking system configured to generate a ticket in response to an error reported via one or more telephone calls, emails, short messaging service (SMS) messages, social media posts, web chats, and/or the like. The issue tracking system may generate the ticket to include a textual description of the error associated with the ticket. As such, in order to determine a suitable response for addressing the error associated with the ticket, the enterprise resource planning system may include a machine learning model trained to perform text classification. For instance, the machine learning model may be trained to determine, based at least on the textual description of the error, a priority for the ticket corresponding to a severity of the error.

SUMMARY

Systems, methods, and articles of manufacture, including computer program products, are provided for a machine learning data processing pipeline. In one aspect, there is provided a system including at least one data processor and at least one memory. The at least one memory may store instructions that cause operations when executed by the at least one data processor. The operations may include: generating a user interface configured to receive, from a client, one or more inputs for constructing a data processing pipeline that generates an optimal machine learning model for performing a task; responding to the one or more inputs received the client by at least adding, to a graph representative of the data processing pipeline, an orchestrator node, a preparator node, and an executor node, the preparator node configured to generate a training dataset for training a machine learning model to perform the task and a validation dataset for evaluating a performance of the machine learning model trained to perform the task, the executor node configured to execute one or more machine learning trials by at least applying, to the training dataset and the validation dataset, one or more machine learning models having different sets of trial parameters, and the orchestrator node configured to identify, based at least on a result of the one or more machine learning trials, the optimal machine learning model for performing the task; generating the optimal machine learning model for performing the task by at least executing, based on the graph, the data processing pipeline including the orchestrator node, the preparator node, and the executor node.

In some variations, one or more features disclosed herein including the following features can optionally be included in any feasible combination. The orchestrator node may be configured to respond to receiving an initial configuration for implementing a machine learning model trained to perform the task by at least triggering, at the preparator node, the generation of the training dataset and the validation dataset. The data processing pipeline may be further generated to include a start node configured to receive, from a user, the initial configuration for implementing the machine learning model.

In some variations, the initial configuration for implementing the machine learning model may include an input dataset associated with the task. The training dataset and the validation dataset may be generated based at least on the input dataset. The orchestrator node may store, in a shared persistence, the input dataset. The preparator node may generate the training dataset and the validation dataset by at least retrieving, from the shared persistence, the input dataset.

In some variations, the data processing pipeline may be dynamically adapted during the executing of the data processing pipeline. The data processing pipeline may be adapted based at least on a metric and/or a configuration of the input dataset. The adaptation may include an omission of an operation in response to an output of a preceding operation.

In some variations, the preparator node may store, in a shared persistence, the training dataset and/or the validation dataset. The executor node may execute the one or more machine learning trials by at least retrieving, from the shared persistence, the training dataset and/or the validation dataset.

In some variations, the executor node may execute a first machine learning trial by at least applying, to the training dataset and the validation dataset, a first machine learning model having a first set of trial parameters. The first set of trial parameters may include an initial weight and/or a plurality of hyper-parameters applied by the first machine learning model. The executor node or another executor node included in the data processing pipeline may further execute a second machine learning trial by at least applying, to the training dataset and the validation dataset, the first machine learning model having a second set of trial parameters or a second machine learning model having a third set of trial parameters.

In some variations, the executor node may execute the first machine learning trial in parallel with the other executor node executing the second machine learning trial. The orchestrator node may be configured to select, as the optimal machine learning model for performing the task, the first machine learning model having the first set of trial parameters, the first machine learning model having the second set of trial parameters, or the second machine learning model having the third set of trial parameters based at least on an evaluation of a respective result of the first machine learning trial and the second machine learning trial relative to a target metric.

In some variations, the data processing pipeline may be further generated to include a user interface node configured to generate a user interface displaying a progress of the executing of the data processing pipeline and the result of the one or more machine learning trials.

In some variations, the graph representative of the data processing pipeline may include one or more directed edges interconnecting the orchestrator node, the preparator node, and the executor node. The one or more directed edges may indicate a flow of data between the orchestrator node, the preparator node, and the executor node.

In some variations, the machine learning model may be a neural network, a regression model, an instance-based model, a regularization model, a decision tree, a random forest, a Bayesian model, a clustering model, an associative model, a dimensionality reduction model, and/or an ensemble model.

In some variations, the user interface may be configured to display, at the client, a selection of operator nodes including the orchestrator node, the preparator node, and the executor node.

In some variations, the user interface may be configured to display, at the client, one or more dialog boxes prompting the one or more inputs for constructing a data processing pipeline.

In another aspect, there is provided a method for a machine learning data processing pipeline. The method may include: generating a user interface configured to receive, from a client, one or more inputs for constructing a data processing pipeline that generates an optimal machine learning model for performing a task; responding to the one or more inputs received the client by at least adding, to a graph representative of the data processing pipeline, an orchestrator node, a preparator node, and an executor node, the preparator node configured to generate a training dataset for training a machine learning model to perform the task and a validation dataset for evaluating a performance of the machine learning model trained to perform the task, the executor node configured to execute one or more machine learning trials by at least applying, to the training dataset and the validation dataset, one or more machine learning models having different sets of trial parameters, and the orchestrator node configured to identify, based at least on a result of the one or more machine learning trials, the optimal machine learning model for performing the task; generating the optimal machine learning model for performing the task by at least executing, based on the graph, the data processing pipeline including the orchestrator node, the preparator node, and the executor node.

In another aspect, there is provided a computer program product that includes a non-transitory computer readable storage medium. The non-transitory computer-readable storage medium may include program code that causes operations when executed by at least one data processor. The operations may include: generating a user interface configured to receive, from a client, one or more inputs for constructing a data processing pipeline that generates an optimal machine learning model for performing a task; responding to the one or more inputs received the client by at least adding, to a graph representative of the data processing pipeline, an orchestrator node, a preparator node, and an executor node, the preparator node configured to generate a training dataset for training a machine learning model to perform the task and a validation dataset for evaluating a performance of the machine learning model trained to perform the task, the executor node configured to execute one or more machine learning trials by at least applying, to the training dataset and the validation dataset, one or more machine learning models having different sets of trial parameters, and the orchestrator node configured to identify, based at least on a result of the one or more machine learning trials, the optimal machine learning model for performing the task; generating the optimal machine learning model for performing the task by at least executing, based on the graph, the data processing pipeline including the orchestrator node, the preparator node, and the executor node.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a machine learning data processing pipeline, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A data processing pipeline may include a series of operations for collecting and/or manipulating data including, for example, exceptionally voluminous and/or complex data sets known as "big data." The data processing pipeline may be represented graphically as a plurality of operator nodes interconnected by one or more directed edges. Each operator node may correspond to a data processing operation performed on data traversing through the operator node. Meanwhile, a directed edge interconnecting two operator nodes may indicate a flow of data between the data processing operations corresponding to each operator node. Accordingly, a graph representative of the data processing pipeline may be constructed by at least interconnecting, with one or more directed edges, a series of operator nodes.

In some example embodiments, the graph representative of the data processing pipeline may be constructed to include one or more operator nodes configured to generate a machine learning model trained to perform a task. For example, the graph may be constructed to include an orchestrator node, one or more preparator nodes, and one or more executor nodes. The orchestrator node may be configured to coordinate the operations of preparator node and the one or more executor node. For instance, each preparator node may be configured to generate, based at least on an input dataset associated with the task, a training dataset and a validation dataset. Meanwhile, each executor node may be configured to apply, to the training dataset and the validation dataset generated by the preparator node, a different machine learning model. The orchestrator node may be configured to determine, based at least on the performance of the different machine learning models, an optimal machine learning model including an optimal set of model parameters and hyper-parameters for performing the task associated with the input dataset. Accordingly, the machine learning model trained to perform the task may be generated by at least executing the data processing pipeline including the orchestrator node, the one or more preparator nodes, and the one or more executor nodes.

Figure 1:
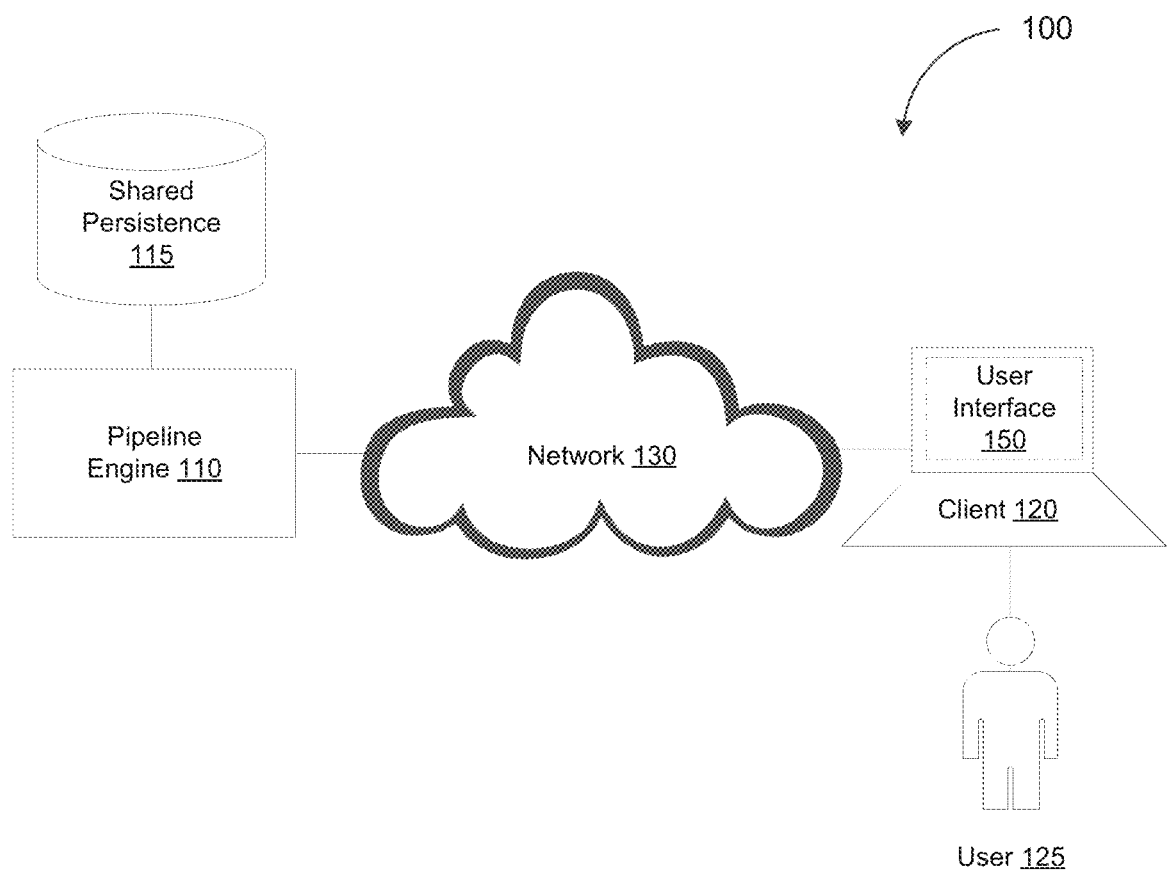
FIG. 1 depicts a system diagram illustrating a data processing pipeline generator system, in accordance with some example embodiments.

FIG. 1 depicts a system diagram illustrating a data processing pipeline generator system 100, in accordance with some example embodiments. Referring to FIG. 1, the data processing pipeline generator system 100 may include a pipeline engine 110. As shown in FIG. 1, the pipeline engine 110 and the client 120 may be communicatively coupled via a network 130. The client 120 may be a processor-based device including, for example, a smartphone, a tablet computer, a wearable apparatus, a virtual assistant, an Internet-of-Things (IoT) appliance, and/or the like. Meanwhile, the network 130 may be any wired and/or wireless network including, for example, a public land mobile network (PLMN), a wide area network (WAN), a local area network (LAN), a virtual local area network (VLAN), the Internet, and/or the like.

The client 120 may interact with the pipeline engine 110 to generate one or more data processing pipelines. As shown in FIG. 1, the pipeline engine 110 may be associated with a user interface 150 configured to receive, from a user 125 at the client 120, one or more inputs for editing a graph representative of a data processing pipeline. In some example embodiments, the one or more inputs may edit the graph representative of the data processing pipeline to include one or more operator nodes configured to generate, based at least on an input dataset, a machine learning model trained to perform a task associated with the input dataset. For example, the graph representative of the data processing pipeline may be edited to include an orchestrator node, one or more preparator node, and one or more executor nodes.

In some example embodiments, the orchestrator node may be configured to coordinate the operations of the one or more executor node. Meanwhile, each executor node may be configured to apply, to a training dataset and a validation dataset generated by the one or more preparator nodes based on the input dataset, a different machine learning model. Furthermore, the orchestrator node may be configured to identify, based at least on the performance of the different machine learning models, an optimal machine learning model for performing the task associated with the input dataset. Accordingly, the machine learning model trained to perform the task may be generated by at least executing the data processing pipeline including the orchestrator node, the one or more preparator nodes, and the one or more executor nodes. For example, the data processing pipeline may be executed to generate a machine learning model trained to perform a cognitive task such as object identification, natural language processing, information retrieval, speech recognition, classification, and/or regression. The machine learning model may be any type of machine learning model including, for example, a neural network, a regression model, an instance-based model, a regularization model, a decision tree, a random forest, a Bayesian model, a clustering model, an associative model, a dimensionality reduction model, an ensemble model, and/or the like.

Figure 2A:
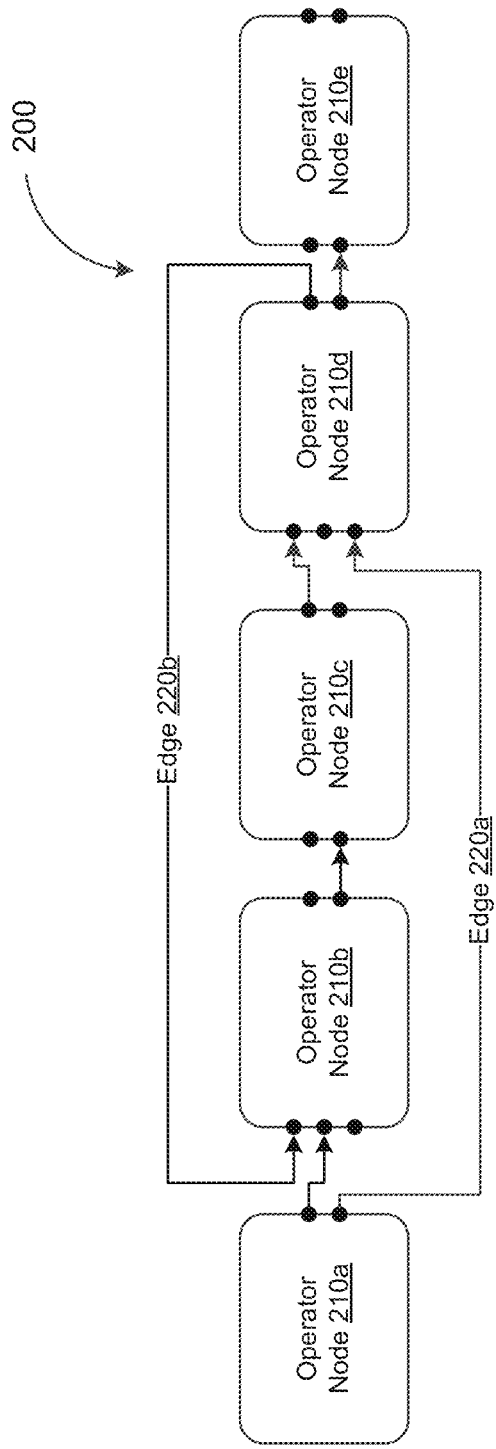
FIG. 2A depicts an example of a graph representative of a data processing pipeline, in accordance with some example embodiments.

To further illustrate, FIG. 2A depicts an example of a graph representative of a data processing pipeline 200, in accordance with some example embodiments. Referring to FIG. 2A, the data processing pipeline 200 may include a plurality of operator nodes including, for example, a first operator node 210a, a second operator node 210b, a third operator node 210c, a fourth operator node 210d, a fifth operator node 210e, and/or the like. Each of the first operator node 210a, the second operator node 210b, the third operator node 210c, the fourth operator node 210d, and/or the fifth operator node 210e may correspond to a data processing operation performed on data traversing through the operator node.

Furthermore, FIG. 2A shows the first operator node 210a, the second operator node 210b, the third operator node 210c, the fourth operator node 210d, and/or the fifth operator node 210e as interconnected via one or more directed edges. A directed edge may indicate a flow of data between the data processing operations corresponding to operator nodes interconnected by the directed edge. For example, a first edge 220a may interconnect the first operator node 210a and the fourth operator node 210d to at least indicate that an output of the data processing operation corresponding to the first operator node 210a is provided as an input to the data processing operation corresponding to the fourth operator node 210d. Alternatively and/or additionally, a second edge 220b interconnected the second operator node 210b and the fourth operator node 210d may indicate that an output of the data processing operation corresponding to the fourth operator node 210d may be provided as an input to the data processing operation corresponding to the second operator node 210b.

Figure 2B:
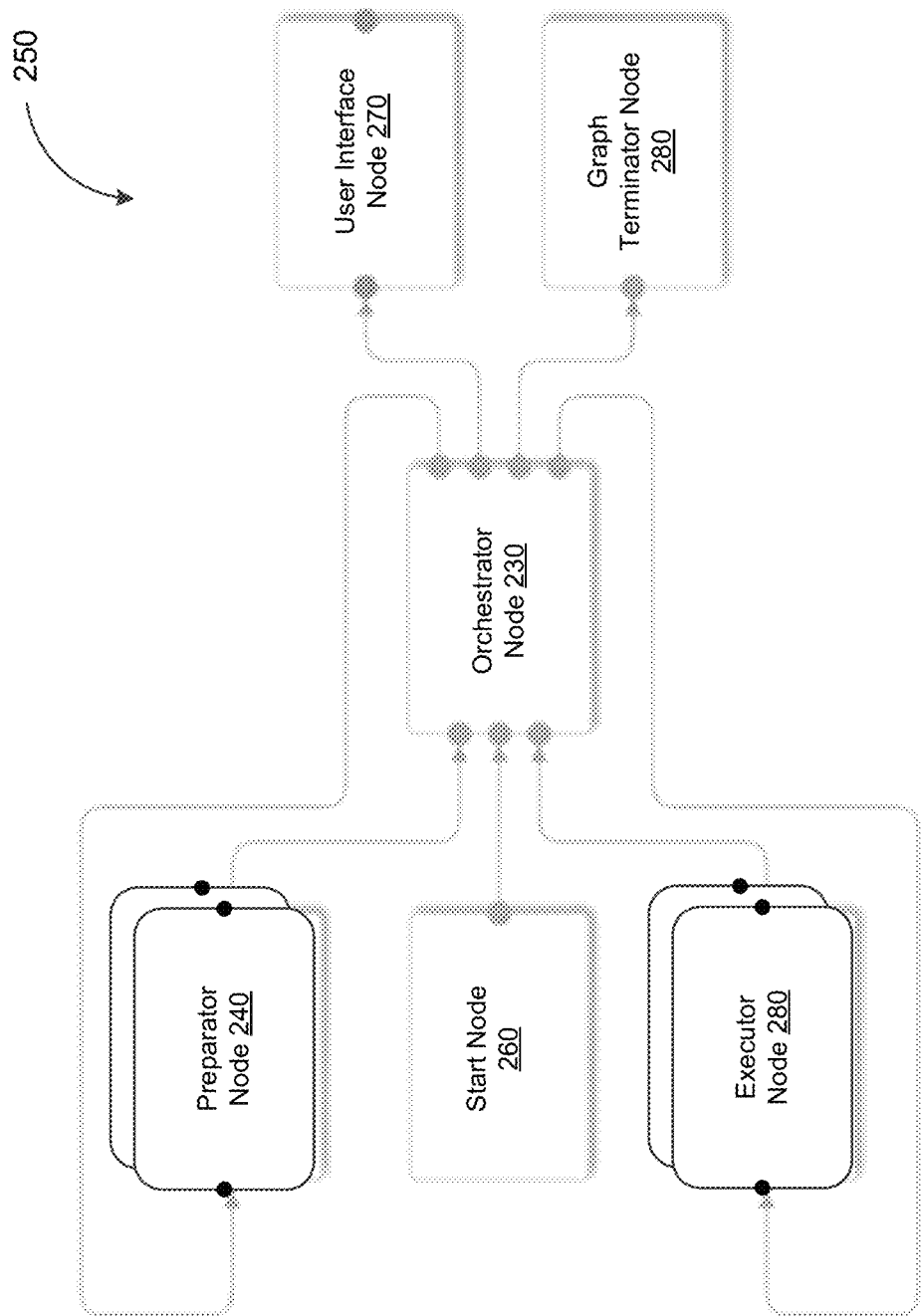
FIG. 2B depicts examples of operator nodes forming a data processing pipeline configured to generate a machine learning model, in accordance with some example embodiments.

In some example embodiments, a data processing pipeline may be constructed to include one or more specific operator nodes in order to implement a machine learning model trained to perform a cognitive task such as, for example, object identification, natural language processing, information retrieval, speech recognition, classification, and/or regression. FIG. 2B depicts examples of operator nodes forming a data processing pipeline 250 configured to generate a machine learning model, in accordance with some example embodiments. As shown in FIG. 2B, the data processing pipeline 250 may be constructed to include an orchestrator node 230 and one more preparator nodes such as, for example, a preparator node 240. Furthermore, the data processing pipeline 250 may be constructed to include one or more executor nodes including, for example, an executor node 280. Alternatively and/or additionally, the data processing pipeline 250 may be constructed to include one or more auxiliary operator nodes including, for example, a start node 260, a user interface node 270, and a graph terminator node 280. The start node 260 may receive an initial configuration to generate a machine learning model as specified, for example, by the user 125 at the client 120. Meanwhile, the user interface node 270 may be configured to generate and/or update the user interface 150 to display, at the client 120, a progress of executing the data processing pipeline 200. The graph terminator node 280 may be invoked to terminate the execution of the data processing pipeline 250.

In some example embodiments, the preparator node 240 may be configured to validate and preprocess an input dataset received, for example, from the client 120. Furthermore, the preparator node 240 may be configured to generate, based at least on the input dataset, a training dataset and a validation dataset. For example, the input dataset may include text associated with one or more errors reported to an issue tracking system. The preparator node 240 may validate the input dataset and terminate additional processing of the input dataset in response to identifying one or more errors present in the input dataset. Upon validating the input dataset, the preparator node 240 may preprocess the input dataset including by removing invalid rows and/or columns of data from the input dataset as well as encoding any text included in the input dataset. The preparator node 240 may partition the validated and preprocessed input dataset into a training dataset for training a machine learning model to perform text classification and a validation dataset for evaluating a performance of the trained machine learning model performing text classification.

In some example embodiments, the executor node 280 may be configured to execute, based on the training dataset and/or the validation dataset generated by the preparator node 240, one or more machine learning trials. Each machine learning trial may include applying, to the training dataset and/or the validation dataset, a machine learning model having a specific set of trial parameters. The set of trial parameters may include one or more parameters of the machine learning model such as, for example, the initial weights applied by the machine learning model prior to training. Furthermore, the set of trial parameters may include one or more hyper-parameters of the machine learning model including, for example, the learning rate (e.g. step size) of a neural network, the value of the constant k in a k-nearest neighbors clustering algorithm, the cost and sigma associated with a support vector machine, and/or the like. It should be appreciated that the executor node 280 may be configured to execute a sequence of machine learning trials, each of which including a different machine learning model and/or a different set of trial parameters. For instance, the executor node 280 may execute a first machine learning trial by at least applying, to the training dataset and/or the validation dataset, a first machine learning model having a first set of trial parameters. The executor node 280 may also execute a second machine learning trial by at least applying, to the training dataset and/or the validation dataset, the first machine learning model having a second set of trial parameters or a second machine learning model having a third set of trial parameters.

In some example embodiments, the orchestrator node 230 may be configured to coordinate the operations of the preparator node 240 and the executor node 280. The orchestrator node 230 may respond to receiving, from the start node 260, the initial configurations for implementing the machine learning model by at least triggering, at the preparator node 240, the generation of the training dataset and the validation dataset. The initial configuration may include, for example, a type of task (e.g., classification, regression, and/or the like), a target column (e.g., column in the training dataset corresponding to a ground-truth label), a target metric (e.g., accuracy), column names and/or types in the training dataset and the validation dataset, a computational resource budget (e.g., maximum execution time and/or the like), a path to an output directory, a path to the training dataset, a path to a validation dataset, and/or the like.

Upon receiving, from the preparator node 240, an indication that the preparator node 240 has generated the training dataset and the validation dataset, the orchestrator node 230 may determine an optimal machine learning model including an optimal set of model parameters and hyper-parameters for performing the task associated with the input dataset (e.g., classify text associated with an issue tracking system and/or the like). For example, the orchestrator node 230 may determine an optimal machine learning model including an optimal set of model parameters and hyper-parameters for performing the task associated with the input dataset by at least triggering, at the executor node 280, the execution of one or more machine learning trials, each of which including a different machine learning model and/or a different set of trial parameters. The orchestrator node 230 may trigger, at the executor node 280, a quantity of machine learning trials that is consistent with the computational resource budget set forth in the initial configurations for implementing the machine learning model. For instance, the orchestrator node 230 may trigger an additional machine learning trial based at least on a quantity of remaining computational resource being sufficient to support the execution of the additional machine learning trial.

The executor node 280 may execute the first machine learning trial including the first machine learning model having the first set of trial parameters and the second machine learning trial including the first machine learning model having the second set of trial parameters or the second machine learning model having the third set of trial parameters. Accordingly, the orchestrator node 230 may select, based at least on the respective performances of the first machine learning model having the first set of trial parameters, the first machine learning model having the second set of trial parameters, and/or the second machine learning model having the third set of trial parameters, the optimal machine learning model including the optimal set of model parameters and hyper-parameters for performing the task associated with the input dataset. Upon selecting the optimal machine learning model including the optimal set of model parameters and hyper-parameters for performing the task associated with the input dataset, the orchestrator node 230 may terminate the execution of the data processing pipeline 250 including by sending, to the graph terminator node 280, a message to terminate the execution of the data processing pipeline 250.

As noted, the executor node 280 may execute the first machine learning trial and the second machine learning trial in sequence. However, it should be appreciated that the data processing pipeline 250 may be constructed to include multiple executor nodes and that orchestrator node 230 may coordinate the operations of the multiple executor nodes executing multiple machine learning trials in parallel. Moreover, the data processing pipeline 250 may be constructed to include multiple preparator nodes and the orchestrator node 230 may coordinate the operations of multiple preparator nodes generating the input dataset and the validation dataset in parallel.

In some example embodiments, the orchestrator node 230, the preparator node 240, and the executor node 280 may communicate via one or more messages. However, these messages may exclude intermediate data such as, for example, the training dataset and the validation dataset generated by the preparator node 240. Instead, the orchestrator node 230, the preparator node 240, and the executor node 280 may exchange intermediate data via a shared persistence 115 accessible to the orchestrator node 230, the preparator node 240, and the executor node 280. For example, the orchestrator node 230 may store, in the shared persistence 115, at least a portion of the initial configurations that includes the input dataset associated with the specified task. Likewise, the preparator node 240 may store, in the shared persistence 115, the training dataset and the validation dataset generated based on the input dataset. Instead of sending the input dataset, the training dataset, and the validation dataset directly, the orchestrator node 230, the preparator node 240, and the executor node 280 may exchange the input dataset, the training dataset, and/or the validation dataset by at least sending messages indicating the availability of the input dataset, the training dataset, and/or the validation dataset in the shared persistence 115. Accordingly, the preparator node 115 may access the shared persistence 115 to retrieve the input dataset in order to generate the training dataset and the validation dataset while the executor node 280 may access the shared persistence 115 to retrieve the training dataset and the validation dataset for use during the execution of the one or more machine learning trials.

Figure 3A:
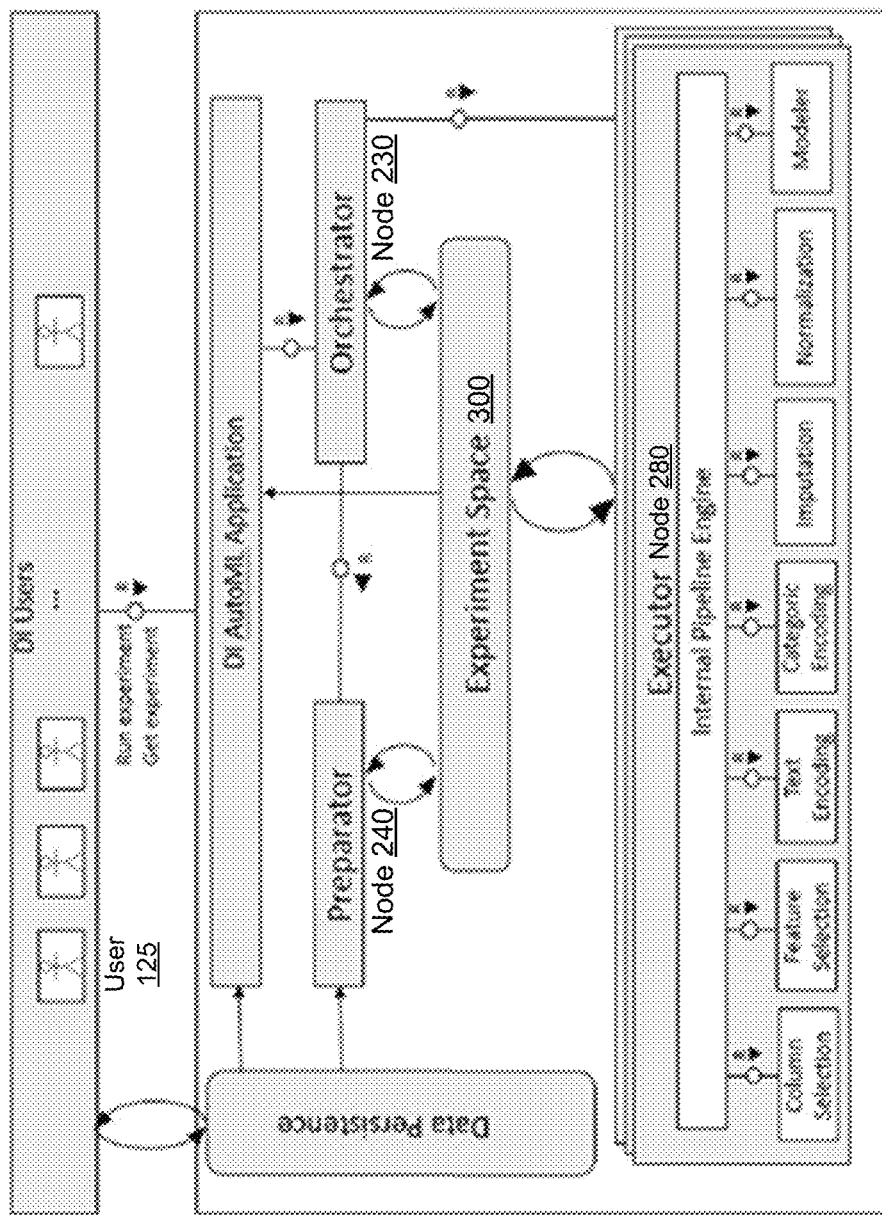
FIG. 3A depicts a block diagram illustrating an example communication flow between the operator nodes forming a data processing pipeline configured to generate a machine learning model, in accordance with some example embodiments.

FIG. 3A depicts a block diagram illustrating an example communication flow between the operator nodes forming the data processing pipeline 250 configured to generate a machine learning model, in accordance with some example embodiments. Referring to FIG. 3A, the orchestrator node 230, the preparator node 240, and the executor node 280 may exchange intermediate data by at least accessing an experiment space 300, which may form a part of the shared persistence 115 shown in FIG. 1. As shown in FIG. 3A, the user 125 at the client 120 may specify the initial configurations for the machine learning model performing a task such as, for example, object identification, natural language processing, information retrieval, speech recognition, classification, and/or regression. In response to receiving the initial configurations for the machine learning model, the orchestrator node 230 may trigger, at the preparator node 240, the generation of the training dataset to train the machine learning model to perform a specified task and the validation dataset to evaluating a performance of the trained machine learning model performing the specified task. The preparator node 240 may store, in the experiment space 300, the training dataset and the validation dataset. Moreover, the preparator node 240 may send, to the orchestrator node 230, the first message notifying the orchestrator node 230 of the availability of the training dataset and the validation dataset.

In response to the first message from the preparator node 240, the orchestrator node 230 may send, to the executor node 280, the second message to trigger the execution of one or more machine learning trials. For example, the executor node 280 may respond to the second message by at least executing the first machine learning trial including the first machine learning model having the first set of trial parameters and/or the second machine learning trial including the first machine learning model having the second set of trial parameters or the second machine learning model having the third set of trial parameters. The executor node 280 may further store, in the experiment space 300, the results of the machine learning trials corresponding, for example, to the respective performances of the first machine learning model having the first set of trial parameters, the first machine learning model having the second set of trial parameters, and/or the second machine learning model having the third set of trial parameters. In order to identify the optimal machine learning model including the optimal set of model parameters and hyper-parameters for performing the specified task, the orchestrator node 230 may at least access the experiment space 300 to evaluate the results of the machine learning trials relative, for example, to the target metric specified by the user 125 as part of the initial configurations for the machine learning model.

The data processing pipeline 250 including the orchestrator node 230, the preparator node 240, and the executor node 280 may be executed to perform feature extraction, feature pre-processing, and training of a machine learning model. For example, the feature extraction may be performed to generate numerical features based on one or more columns of data from the input dataset including by encoding categorical features and/or extracting values from the data fields in each column. The feature-preprocessing may include a normalization of values occupying one or more columns in the input dataset. Accordingly, the machine learning model may be trained by at least applying the machine learning model to the numerical columns generated by the feature extraction and/or the feature pre-processing.

In some example embodiments, the data processing pipeline 250 may be configured to adapt dynamically based on the metrics and/or configuration of the input dataset. Furthermore, the data processing pipeline 250 may adapt dynamically based on one or more previous processing operations in the data processing pipeline 250. As such, some operations may be omitted from the data processing pipeline 250 to reduce operation cost, minimize training time, and increase the accuracy of the resulting machine learning model. For example, whether the executor node 250 performs feature selection may be contingent upon the quantity of available features. That is, the executor node 250 may perform feature selection if more than a threshold quantity of features are available. The executor node 250 may also avoid subjecting embedded columns to any additional processing in order to avoid distorting the embedding space. In the event the input dataset does not include any columns with textual data, the executor node 250 may omit any text encoding, thereby reducing the hyper-parameter space. Moreover, the executor node 250 may also exclude the one or more column from the input dataset determined to have below-threshold information value such as, for example, columns with below threshold value target cross-entropy.

In some example embodiments, the quantization of a hyper-parameter may be adapted based on the metrics of the input dataset including, for example, the quantity of columns and/or the quantity of unique values across columns containing certain datatypes. As used herein, the "quantization" of hyper-parameter may refer to the discrete values that the hyper-parameter may take on during each machine learning trial. For example, if the hyper-parameter column sampling rate yields substantially the same results at 10% and at 12%, then the hyper-parameter column sampling rate may be varied at increments of 20% for each machine learning trial.

Figure 3B:
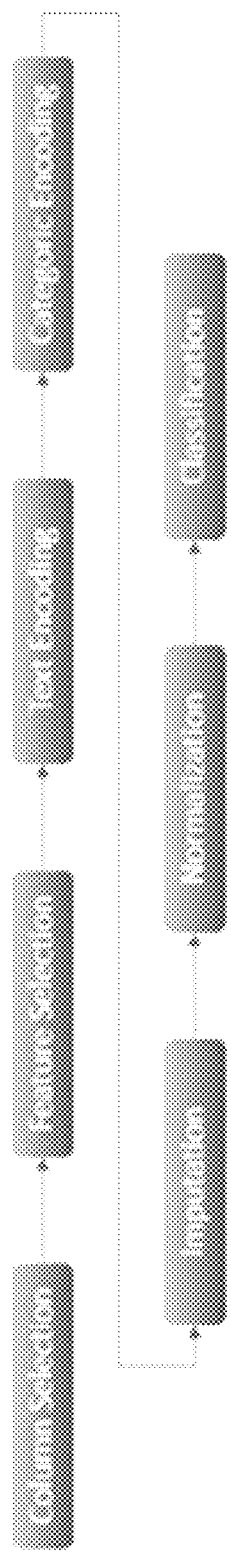
FIG. 3B depicts a flowchart illustrating examples of the data processing operations performed by an executor node forming a data processing pipeline configured to generate a machine learning model, in accordance with some example embodiments.

FIG. 3B depicts a flowchart illustrating examples of the data processing operations performed by the executor node 280 forming the data processing pipeline 250 configured to generate a machine learning model, in accordance with some example embodiments. In some example embodiments, the executor node 280 may respond to the second message from the orchestrator node 230 by at least accessing the shared persistence 115 to retrieve the training dataset and/or the validation dataset generated by the preparator node 240. The executor node 280 may perform, on the training dataset and/or the validation dataset, a sequence of data processing operations, each of which applying a different transformation on the training dataset and/or the validation dataset. As shown in FIG. 3B, the executor node 280 may perform data processing operations that include, as the example, a column selection operation, a feature selection operation, a text encoding operation, a categorical encoding operation, an imputation operation, a normalization operation, a classification operation, and/or the like.

In some example embodiments, the executor node 280 performing a single machine learning trial may generate a corresponding candidate machine learning model having a specific set of parameters and/or hyper-parameters. The executor node 280 may store, in the shared persistence 115 (e.g., the experiment space 300), the candidate machine learning model. Moreover, the executor node 280 may send, to the orchestrator node, the result of the machine learning trial, which may correspond to the performance of the candidate machine learning model operating on the validation dataset. For example, the executor node 280 may store, in the shared persistence 115 (e.g., the experiment space 300), the result of the machine learning trial such that the orchestrator node 230 may access the shared persistence 115 (e.g., the experiment space 300) to retrieve the result of the machine learning trial. As noted, the orchestrator node 230 may access the shared persistence 115 (e.g., the experiment space 300) in order to evaluate the results of one or more machine learning trials and identify an optimal machine learning model including an optimal set of model parameters and hyper-parameters for performing the task specified by the user 125 at the client 120.

Figure 4A:
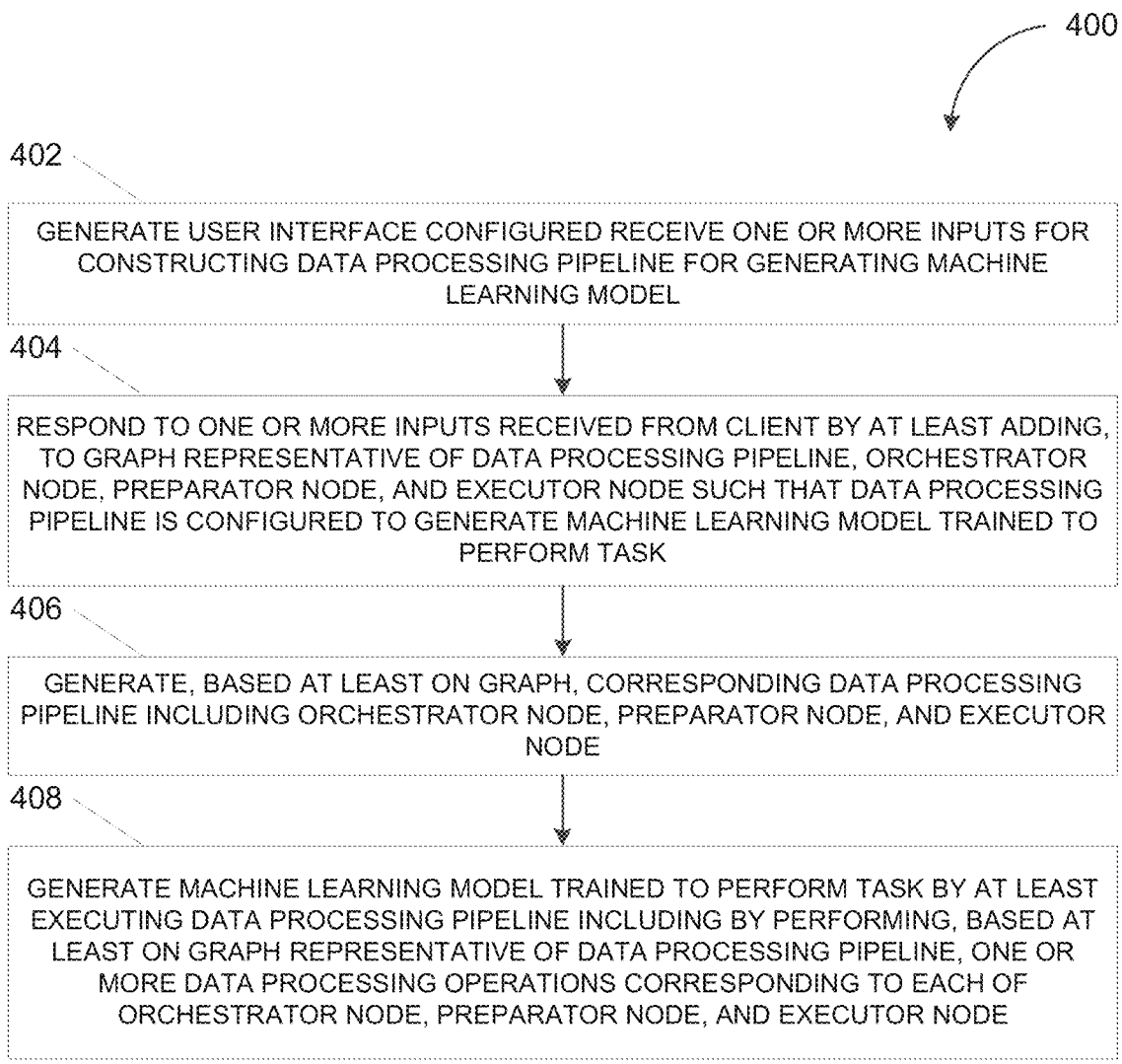
FIG. 4A depicts a flowchart illustrating a process for generating a data processing pipeline configured to generate a machine learning model, in accordance with some example embodiments.

FIG. 4A depicts a flowchart illustrating a process 400 for generating a data processing pipeline configured to generate a machine learning model, in accordance with some example embodiments. Referring to FIGS. 1, 2A-B, 3A-B, and 4A, the process 400 may be performed by the pipeline engine 110 in order to generate, for example, the data processing pipeline 250 configured to generate a machine learning model. The machine learning model generated by the data processing pipeline may an optimal machine learning model having an optimal set of parameters and/or hyper-parameters for performing a cognitive task such as, for example, object identification, natural language processing, information retrieval, speech recognition, classification, and/or regression.

At 402, the pipeline engine 110 may generate a user interface configured to receive one or more inputs for constructing of a data processing pipeline for generating a machine learning model. For example, the pipeline engine 110 may generate the user interface 150 which may be configured to display, at the client 120, a selection of operator nodes including, for example, the orchestrator node 230, the preparator node 240, and the executor node 280. The selection of operator nodes displayed, at the client 120, as part of the user interface 150 may also include one or more auxiliary operator nodes including, for example, the start node 260, the user interface node 270, and/or the like. Alternatively, the pipeline engine 110 may generate the user interface 150 to receive, from the user 125 at the client 120, one or more inputs configuring the data processing pipeline 250. The user interface 150 may not display a selection of operator nodes but may instead display one or more dialog boxes prompting the user 125 for the inputs necessary to configure the data processing pipeline 250.

At 404, the pipeline engine 110 may respond to one or more inputs received from the client 120 by at least adding, to a graph representative of a data processing pipeline, the orchestrator node, the preparator node, and the executor node such that the data processing pipeline is configured to generate a machine learning model trained to perform a task. For example, the pipeline engine 110 may respond to one or more inputs received from the client 120 by at least generating a graph representative of the data processing pipeline 250 configured to generate a machine learning model. In the example shown in FIG. 2B, the data processing pipeline 250 may be constructed to include the orchestrator node 230, the preparator node 240, and the executor node 280. Furthermore, as shown in FIG. 2B, the data processing pipeline 250 may be constructed to include the start node 260 and the user interface node 270.

The orchestrator node 230, the preparator node 240, the start node 260, the user interface node 270, and the executor node 280 may be interconnected by one or more directed edges indicating a flow of data between the orchestrator node 230, the preparator node 240, the start node 260, the user interface node 270, and the executor node 280. For instance, the orchestrator node 230 and the preparator node 240 may be interconnected by a first directed edge indicating that an output of the orchestrator node 230 may be provided as an input to the preparator node 240 as well as a second directed edge indicating that an output of the preparator node 240 may be provided as an input to the orchestrator node 230. Alternatively and/or additionally, the orchestrator node 230 and the executor node 280 may be interconnected by a third directed edge indicating that an output of the orchestrator node 230 may be provided as an input to the executor node 280 as well as a fourth directed edge indicating that an output of the executor node 280 may be provided as an input to the orchestrator node 230.

At 406, the pipeline engine 110 may generate, based at least on the graph, the corresponding data processing pipeline including the orchestrator node, the preparator node, and the executor node. For instance, in some example embodiments, the pipeline engine 110 may generate, based at least on the corresponding graph, the data processing pipeline 250 including the orchestrator node 230, the preparator node 240, the start node 260, the user interface node 270, and the executor node 280

At 408, the pipeline engine 110 may generate a machine learning model trained to perform the task by at least executing the data processing pipeline including by performing, based at least on the graph representative of the data processing pipeline, one or more data processing operations corresponding to each of the orchestrator node, the preparator node, and the executor nodes included in the data processing pipeline. For example, the pipeline engine 110 may generate a machine learning model trained to perform a task by at least executing the data processing pipeline 250 including the orchestrator node 230, the preparator node 240, the executor node 250, the start node 260, and the user interface node 270. Executing the data processing pipeline 250 may include performing the one or more data processing operations associated with each of the orchestrator node 230, the preparator node 240, the executor node 250, the start node 260, and the user interface node 270.

In some example embodiments, the orchestrator node 230 may be executed to at least coordinate the operations of the preparator node 240 and the executor node 280. For example, the orchestrator node 230 may respond to receiving, from the start node 260, the initial configurations for implementing the machine learning model by at least triggering, at the preparator node 240, the generation of the training dataset and the validation dataset. Upon receiving, from the preparator node 240, an indication that the preparator node 240 has generated the training dataset and the validation dataset, the orchestrator node 230 may trigger, at the executor node 280, the execution of one or more machine learning trials, each of which applying a different machine learning model and/or a different set of trial parameters to the training dataset and/or the validation dataset generated by the preparator node 240. Moreover, the orchestrator node 230 may be executed to at least determine, based at least on the results of the machine learning trials executed by the executor node 280, an optimal machine learning model including the optimal set of model parameters and hyper-parameters for performing a specified task.

Figure 4B:
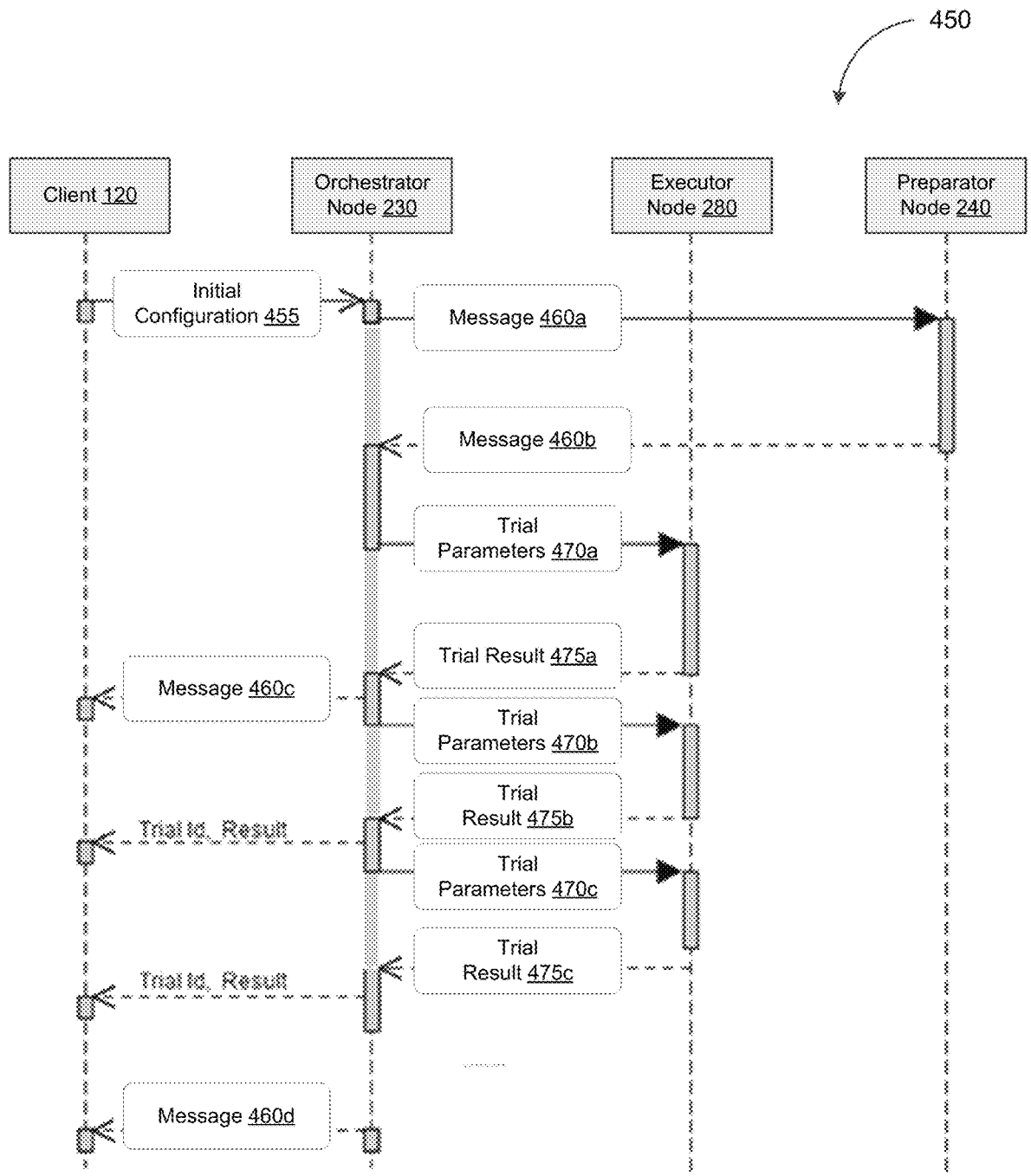
FIG. 4B depicts a sequence diagram illustrating a process for generating a machine learning model trained to perform a task, in accordance with some example embodiments.

FIG. 4B depicts a sequence diagram illustrating a process 450 for generating a machine learning model trained to perform a task, in accordance with some example embodiments. Referring to FIGS. 1, 2A-B, 3A-B, and 4A-B, the process 450 may be performed by the pipeline engine 110 as part of executing the data processing pipeline 250 to generate an optimal machine learning model having an optimal set of parameters and/or hyper-parameters for performing a cognitive task such as, for example, object identification, natural language processing, information retrieval, speech recognition, classification, and/or regression.

The orchestrator node 230 may receive, from the client 120, an initial configuration 455 for implementing a machine learning model to perform a cognitive task such as, for example, object identification, natural language processing, information retrieval, speech recognition, classification, and/or regression. In response to receiving the initial configuration 455 from the client 120, the orchestrator node 230 may trigger, at the preparator node 240, the generation of a training dataset for training the machine learning model to perform the task and a validation dataset for evaluating a performance of the machine learning model trained to perform the task. As shown in FIG. 4B, the orchestrator node 230 may trigger the generation of the training dataset and the validation dataset by at least sending, to the preparator node 240, a first message 460a. The preparator node 240 may respond to the first message 460a by generating the training dataset and the validation dataset as well as perform one or more preparatory tasks such as the embedding and/or encoding a variety of data (e.g., textual data, numerical data, spatial data, categorical data, and/or the like). When the preparator node 240 completes generating the training dataset and the validation dataset as well as the preparatory tasks, the preparator node 240 may send, to the orchestrator node 230, a second message 460b notifying the orchestrator node 230 of the availability of the training dataset and the validation dataset as well as the results of the preparatory tasks. The preparator node 240 may store the training dataset and the validation dataset in the shared persistence 115 (e.g., the experiment space 300) where the training dataset and the validation dataset may be accessible to the orchestrator node 230 and the executor node 280. As such, the preparator node 240 may avoid sending the training dataset and the validation dataset directly to the orchestrator node 230 in the second message 460b.

The orchestrator node 230 may respond to the second message 460b by at least triggering, at the executor node 280, the execution of a first machine learning trial. As shown in FIG. 4B, the orchestrator node 230 may trigger the execution of the first machine learning trial by at least sending, to the executor node 280, a first set of trial parameters 470a. The first set of trial parameters 470a may include one or more parameters of the machine learning model such as, for example, the initial weights applied by the machine learning model prior to training. Furthermore, the first set of trial parameters 470a may include one or more hyper-parameters of the machine learning model including, for example, the learning rate (e.g., step size) of a neural network, the value of the constant k in a k-nearest neighbors clustering algorithm, the cost and sigma associated with a support vector machine, and/or the like. The executor node 280 may execute the first machine learning trial by at least applying, to the training dataset and the validation dataset generated by the preparator node 240, a machine learning model having the first set of trial parameters 470a.

In some example embodiments, the orchestrator node 230 may continue to trigger the execution of additional machine learning trials if there are sufficient remaining computational resources (e.g., execution time and/or the like) to support the execution of additional machine learning trials. For example, FIG. 4B shows the orchestrator node 230 as sending, to the executor node 280, a second set of trial parameters 470b to trigger the execution of a second machine learning trial at the executor node 280 and a third set of trial parameters 470c to trigger the execution of a third machine learning trial at the executor node 280.

The executor node 280 may return, to the orchestrator node 230, a first trial result 475a of executing the first machine learning trial, a second trial result 475b of executing the second machine learning trial, and a third trial result 475c of executing the third machine learning trial. The first trial result 475a, the second trial result 475b, and the third trial result 475c may correspond to a performance of one or more machine learning models having the first set of trial parameters 470a, the second set of trial parameters 470b, and the third set of trial parameters 470c. Moreover, it should be appreciated that the executor node 280 may send the first trial result 475a, the second trial result 475b, and the third trial result 475c to the orchestrator node 230 by at least storing the first trial result 475a, the second trial result 475b, and the third trial result 475c in the shared persistence 115 (e.g., the experiment space 300).

According to some example embodiments, the executor node 280 may evaluate the first trial result 475a, the second trial result 475b, and the third trial result 475c relative, for example, to the target metric specified by the user 125 as part of the initial configurations for the machine learning model in order to identify the optimal machine learning model having the optimal set of parameters and/or hyper-parameters for performing the task. The executor node 280 may select, for example, the first set of trial parameters 470*a* and the machine learning model associated with the first set of trial parameters 470*a* based at least on the first trial result 475*a* being more optimal with respect to the target metric specified by the user 125 than the second trial result 475*b* and the third trial result 475*c*.

In the example shown in FIG. 4B, the orchestrator node 230 may send, to the client 120, one or more messages indicating a status of the machine learning trials. For instance, the orchestrator node 230 may send, to the client 120, a third message 460*c* including the first trial result 475*a* of the first machine learning trial executed by the executor node 280. Alternatively and/or additionally, the orchestrator node 230 may send, to the client 120, a fourth message 460*d* including the third trial result 475*c* of the third machine learning trial executed by the executor node 280 as well as an indication of a completion of the machine learning trials. The orchestrator node 230 may communicate with to the client 120 via the user interface node 270, which may be configured to generate and/or update the user interface 150 to display, at the client 120, at least a portion of the content of the third message 460*c* and/or the fourth message 460*d*.

Figure 5:
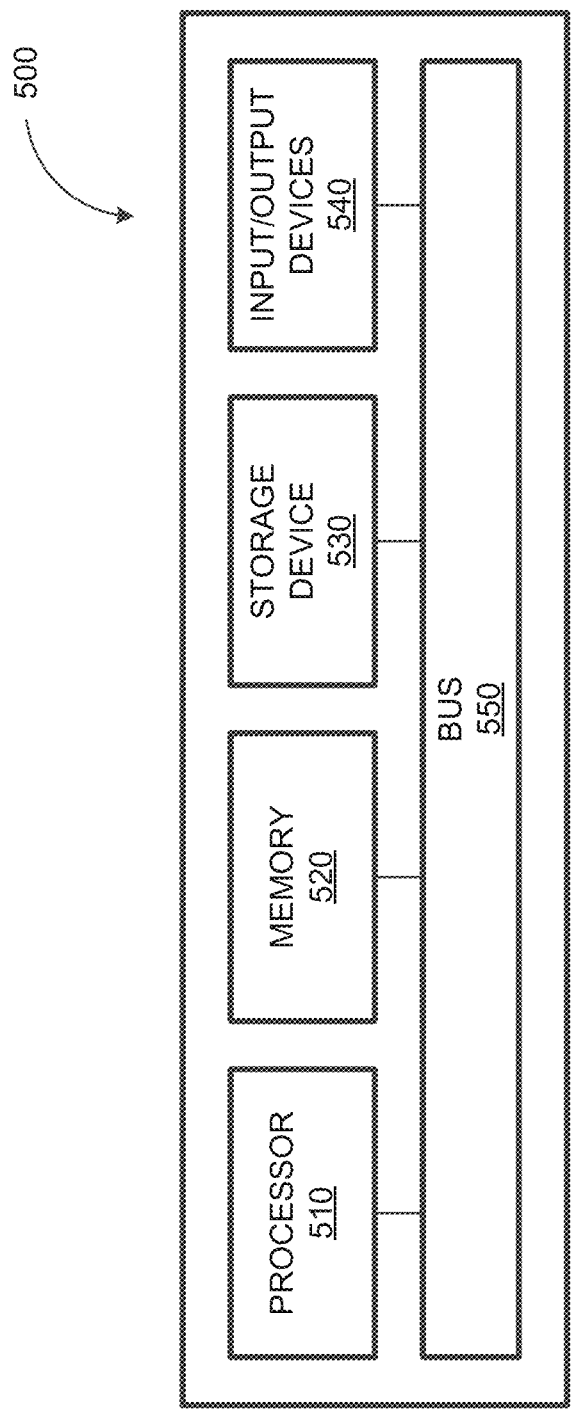
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the pipeline engine 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the pipeline engine 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a solid state drive, a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random query memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   generating a user interface configured to receive, from a client, one or more inputs for constructing a data processing pipeline that generates an optimal machine learning model for performing a task;
   responding to the one or more inputs received the client by at least adding, to a graph representative of the data processing pipeline, an orchestrator node, a preparator node, and an executor node, the preparator node configured to generate a training dataset for training a machine learning model to perform the task and a validation dataset for evaluating a performance of the machine learning model trained to perform the task, the executor node configured to execute one or more machine learning trials by at least applying, to the training dataset and the validation dataset, one or more machine learning models having different sets of trial parameters, and the orchestrator node configured to identify, based at least on a result of the one or more machine learning trials, the optimal machine learning model for performing the task; and
   generating the optimal machine learning model for performing the task by at least executing, based on the graph, the data processing pipeline including the orchestrator node, the preparator node, and the executor node.

2. The system of claim 1, wherein the orchestrator node is configured to respond to receiving an initial configuration for implementing a machine learning model trained to perform the task by at least triggering, at the preparator node, the generation of the training dataset and the validation dataset.

3. The system of claim 2, wherein the data processing pipeline is further generated to include a start node configured to receive, from a user, the initial configuration for implementing the machine learning model.

4. The system of claim 2, wherein the initial configuration for implementing the machine learning model includes an input dataset associated with the task, and wherein the training dataset and the validation dataset are generated based at least on the input dataset.

5. The system of claim 4, wherein the orchestrator node stores, in a shared persistence, the input dataset, and wherein the preparator node generates the training dataset and the validation dataset by at least retrieving, from the shared persistence, the input dataset.

6. The system of claim 4, wherein the data processing pipeline is dynamically adapted during the executing of the data processing pipeline, wherein the data processing pipeline is adapted based at least on a metric and/or a configuration of the input dataset, and wherein the adaptation includes an omission of an operation in response to an output of a preceding operation.

7. The system of claim 2, wherein the preparator node stores, in a shared persistence, the training dataset and/or the validation dataset, and wherein the executor node executes the one or more machine learning trials by at least retrieving, from the shared persistence, the training dataset and/or the validation dataset.

8. The system of claim 1, wherein the executor node executes a first machine learning trial by at least applying, to the training dataset and the validation dataset, a first machine learning model having a first set of trial parameters.

9. The system of claim 8, wherein the first set of trial parameters includes an initial weight and/or a plurality of hyper-parameters applied by the first machine learning model.

10. The system of claim 8, wherein the executor node or another executor node included in the data processing pipeline further executes a second machine learning trial by at least applying, to the training dataset and the validation dataset, the first machine learning model having a second set of trial parameters or a second machine learning model having a third set of trial parameters.

11. The system of claim 10, wherein the executor node executes the first machine learning trial in parallel with the other executor node executing the second machine learning trial.

12. The system of claim 10, wherein the orchestrator node is configured to select, as the optimal machine learning model for performing the task, the first machine learning model having the first set of trial parameters, the first machine learning model having the second set of trial parameters, or the second machine learning model having the third set of trial parameters based at least on an evaluation of a respective result of the first machine learning trial and the second machine learning trial relative to a target metric.

13. The system of claim 1, wherein the data processing pipeline is further generated to include a user interface node configured to generate a user interface displaying a progress of the executing of the data processing pipeline and the result of the one or more machine learning trials.

14. The system of claim 1, wherein the graph representative of the data processing pipeline includes one or more directed edges interconnecting the orchestrator node, the preparator node, and the executor node.

15. The system of claim 14, wherein the one or more directed edges indicate a flow of data between the orchestrator node, the preparator node, and the executor node.

16. The system of claim 1, wherein the machine learning model comprises a neural network, a regression model, an instance-based model, a regularization model, a decision tree, a random forest, a Bayesian model, a clustering model, an associative model, a dimensionality reduction model, and/or an ensemble model.

17. The system of claim 1, wherein the user interface is configured to display, at the client, a selection of operator nodes including the orchestrator node, the preparator node, and the executor node.

18. The system of claim 1, wherein the user interface is configured to display, at the client, one or more dialog boxes prompting the one or more inputs for constructing a data processing pipeline.

19. A computer-implemented method, comprising:
generating a user interface configured to receive, from a client, one or more inputs for constructing a data processing pipeline that generates an optimal machine learning model for performing a task;
responding to the one or more inputs received the client by at least adding, to a graph representative of the data processing pipeline, an orchestrator node, a preparator node, and an executor node, the preparator node configured to generate a training dataset for training a machine learning model to perform the task and a validation dataset for evaluating a performance of the machine learning model trained to perform the task, the executor node configured to execute one or more machine learning trials by at least applying, to the training dataset and the validation dataset, one or more machine learning models having different sets of trial parameters, and the orchestrator node configured to identify, based at least on a result of the one or more machine learning trials, the optimal machine learning model for performing the task; and
generating the optimal machine learning model for performing the task by at least executing, based on the graph, the data processing pipeline including the orchestrator node, the preparator node, and the executor node.

20. A non-transitory computer readable medium storing instructions, which when executed by at least one data processor, result in operations comprising:
generating a user interface configured to receive, from a client, one or more inputs for constructing a data processing pipeline that generates an optimal machine learning model for performing a task;
responding to the one or more inputs received the client by at least adding, to a graph representative of the data processing pipeline, an orchestrator node, a preparator node, and an executor node, the preparator node configured to generate a training dataset for training a machine learning model to perform the task and a validation dataset for evaluating a performance of the machine learning model trained to perform the task, the executor node configured to execute one or more machine learning trials by at least applying, to the training dataset and the validation dataset, one or more machine learning models having different sets of trial parameters, and the orchestrator node configured to identify, based at least on a result of the one or more machine learning trials, the optimal machine learning model for performing the task; and
generating the optimal machine learning model for performing the task by at least executing, based on the graph, the data processing pipeline including the orchestrator node, the preparator node, and the executor node.

* * * * *